United States Patent
Hu et al.

(10) Patent No.: US 10,715,320 B2
(45) Date of Patent: Jul. 14, 2020

(54) PASSWORD GENERATION WITH KEY AND DERIVATION PARAMETER

(71) Applicants: HEWLETT PACKARD ENTERPRISE DEVELOPMENT LP, Houston, TX (US); Wen-Da Hu, Shanghai (CN); Shu-Jia Hua, Shanghai (CN); Peter An-Ping Huang, Palo Alto, CA (US)

(72) Inventors: Wen-Da Hu, Shanghai (CN); Shu-Jia Hua, Shanghai (CN); Peter An-Ping Huang, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 195 days.

(21) Appl. No.: 15/757,450

(22) PCT Filed: Sep. 4, 2015

(86) PCT No.: PCT/CN2015/088930
§ 371 (c)(1),
(2) Date: Mar. 5, 2018

(87) PCT Pub. No.: WO2017/035823
PCT Pub. Date: Mar. 9, 2017

(65) Prior Publication Data
US 2018/0248689 A1     Aug. 30, 2018

(51) Int. Cl.
*H04L 29/06* (2006.01)
*H04L 9/08* (2006.01)
(Continued)

(52) U.S. Cl.
CPC ............ *H04L 9/0863* (2013.01); *G06F 21/46* (2013.01); *H04L 9/3242* (2013.01)

(58) Field of Classification Search
CPC ..................................................... H04L 9/0863
See application file for complete search history.

(56) References Cited

U.S. PATENT DOCUMENTS 6,834,112 B1 * 12/2004 Brickell .................. G06F 21/31
380/279
7,136,490 B2    11/2006 Martinez et al.
(Continued)

FOREIGN PATENT DOCUMENTS

| CN | 101159556 A | 9/2008 |
| CN | 103139136 A | 6/2013 |
| CN | 104348609 A | 2/2015 |

OTHER PUBLICATIONS

"Generating Application Passwords," 2011; 1-page, Retrieved from the Internet on Jun. 9, 2015 at URL: <apps.na.collabserv.com/help/index.jsp?topic=%2Fcom.ibm.cloud.welcome.doc%2Ft_use_application_passwords.html>.
(Continued)

*Primary Examiner* — Shawnchoy Rahman
(74) *Attorney, Agent, or Firm* — Hewlett Packard Enterprise Patent Department (57) ABSTRACT

In some examples, a method includes receiving a user input string and generating an application password for a particular application from the user input string. Generating the application password may include generating a key for the particular application and specifying a derivation parameter of the application password by applying an indiscriminate selection process to select a character set from multiple character sets for generating the application password. Generating the application password may also include mapping a portion of a hash value of the key and the user input string to characters of the character set selected through the indiscriminate selection process to obtain the application password.

11 Claims, 8 Drawing Sheets

(51) Int. Cl.
*G06F 21/46* (2013.01)
*H04L 9/32* (2006.01)

(56) References Cited

U.S. PATENT DOCUMENTS

| | | | |
|---|---|---|---|
| 7,197,765 | B2 | 3/2007 | Chan et al. |
| 8,254,571 | B1 | 8/2012 | Boyen |
| 9,887,838 | B2* | 2/2018 | Khosravi ............... H04L 9/0841 |
| 2002/0087890 | A1* | 7/2002 | Chan ..................... G06F 21/41 |
| | | | 726/5 |
| 2003/0131266 | A1 | 7/2003 | Best et al. |
| 2003/0188150 | A1 | 10/2003 | Ohkado et al. |
| 2009/0228714 | A1 | 9/2009 | Fiske et al. |
| 2010/0031343 | A1* | 2/2010 | Childress ............... G06F 21/46 |
| | | | 726/18 |
| 2011/0179473 | A1* | 7/2011 | Lee ....................... G06F 21/606 |
| | | | 726/6 |
| 2011/0302398 | A1* | 12/2011 | Ureche ................ H04L 9/0822 |
| | | | 713/2 |
| 2014/0149742 | A1 | 5/2014 | Yau |
| 2015/0040239 | A1* | 2/2015 | Buerk ..................... H04L 63/20 |
| | | | 726/26 |
| 2015/0278493 | A1* | 10/2015 | Arning ................... G06F 21/45 |
| | | | 726/6 |
| 2018/0012014 | A1* | 1/2018 | Sahin ..................... H04L 9/0863 |

OTHER PUBLICATIONS

International Search Report and Written Opinion, International Application No. PCT/CN2015/088930, dated Jun. 7, 2016, pp. 1-6, SIPO.
European Supplementary Search Report and Search Opinion Received for EP Application No. 15902630.1, dated Mar. 8, 2019, 8 pages.
Blum et al., "Universal and Perfect Hashing", Lecture 10, CMU 15-451 (Algorithms), Fall 2011, 7 pages.
Anonymous: "Salt (cryptography)—Wikipedia", Apr. 26, 2014 (Apr. 26, 2014), XP055355192, Retrieved from the Internet: URL:https://en.wikipedia.org/w/index.php?title=Salt_cryptography)&oldid=605916302 [retrieved on Mar. 15, 2017].

* cited by examiner

PASSWORD GENERATION WITH KEY AND DERIVATION PARAMETER

BACKGROUND

With rapid advances in technology, electronic devices are increasingly prevalent in society today. Laptop computers, desktop computers, mobile phones, and tablet devices are but a few examples of electronic devices allowing a user to access digital data, communicate across vast interconnected networks (such as the Internet), and execute local or web-based applications. Increasing the efficiency and security of electronic devices will further improve user experience.

BRIEF DESCRIPTION OF THE DRAWINGS

Certain examples are described in the following detailed description and in reference to the drawings.

DETAILED DESCRIPTION

Password theft is a growing issue in the digital age. As digital data becomes increasingly prevalent in society today, increasing the security and strength of application passwords is a technological challenge in the face of cyber-attackers seeking to crack or steal application passwords from unwary users. Secure password generation may require increased password complexity or technical solutions to increase the difficulty by which attackers can obtain the application password of a user.

The discussion herein may provide for methods, devices, systems, circuitry, and logic that increase password security. In particular, the features described herein may provide for password generation through multiple different elements, including a user input string, a generated key, and derivation parameters. The derivation parameters may be determined through an indiscriminate selection process (e.g., randomly), example derivation parameters including a selected hash function, hashing iteration value, and character set with corresponding character encodings. Increasing the entropy in generating the application password through multiple derivation parameters selected indiscriminately may protect against brute-force password attacks while also separating the application password into multiple, different elements. The key and derivation parameters may be stored in different, remote storages, which may further increase the password security by requiring an attacker to gain access to the multiple, different storages to retrieve the elements to generate the application password.

The features described herein may also improve user password experience. For example, the password generation features described herein may provide passwords of increased security, strength, entropy, or randomness while allowing a user to provide a simpler input string to generate the password. With one or a small set of user input strings (that may be easily remembered by the user), the features described herein may generate different secure passwords for different applications, which provide password security while improving user experience. Moreover, the features described herein may mitigate risk in that a breach of the user input string may not compromise the application passwords, in that the key and derivation parameters also used to generate the application passwords may be remotely stored and secured. As yet another benefit, the features described herein may provide for dynamic generation of application passwords "on the fly", which may reduce risk of password word were the application password statically stored or transmitted across a communication network.

Figure 1:
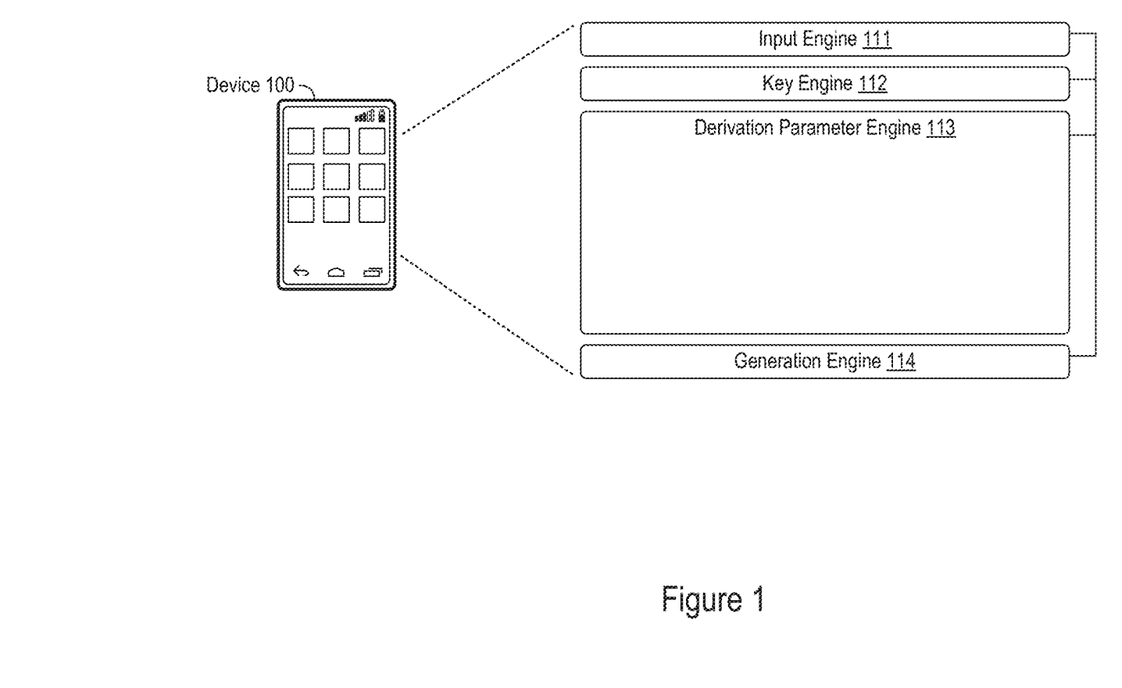
FIG. 1 shows an example of a device that supports application password generation with a key and derivation parameters.

FIG. 1 shows an example of a device 100 that supports application password generation with a key and derivation parameters. The device 100 may take the form of any computing or electronic device that accesses an application. The application may be a local application executed by the device 100, a web-based application accessed through a web browser, or any other type of application requiring a password to access. In the example shown in FIG. 1, the device 100 takes the form of a mobile phone. Other example forms that the device 100 may take include a desktop or laptop computer, a tablet device, a portable e-mail device, personal digital assistant (PDA), portable music device, any wearable electronic device (such as a smartwatch or an optical head-mounted electronic device), and more.

As described in greater detail below, the device 100 may support generation of multiple, different application passwords through a common user input (e.g., a single password easily remembered by a user). In generating an application password from the user input, the device 100 may randomize various parameters used to generate the password, such applying a hash function, hashing iteration value, or a character set selected through an indiscriminate selection process. By doing so, the device 100 may increase the entropy in generating the application password, which may resulted in increased password strength.

As one example, the device 100 shown in FIG. 1 includes an input engine 111, key engine 112, derivation parameter engine 113, and generation engine 114. The device 100 may implement the engines 111-114 as any combination of hardware and programming to implement the functionalities of the engines described herein. For example, the programming for the engines may take the form of processor-executable instructions stored on a non-transitory machine-readable storage medium and the hardware for the engines may include a processing resource to execute those instructions. A processing resource may include one or multiple processors, for example.

In operation, the input engine 111 may receive a user input string for generating an application password for a particular application. The key engine 112 may generate a key for the particular application and the derivation parameter engine 113 may specify derivation parameters for the application password, such as any combination of a hash function, hashing iteration value, and character set selected through applying an indiscriminate selection process. The generation engine 114 may generate the application password from the user input string, key, and derivation parameters. These and other password generation features are described in greater next.

Figure 2:
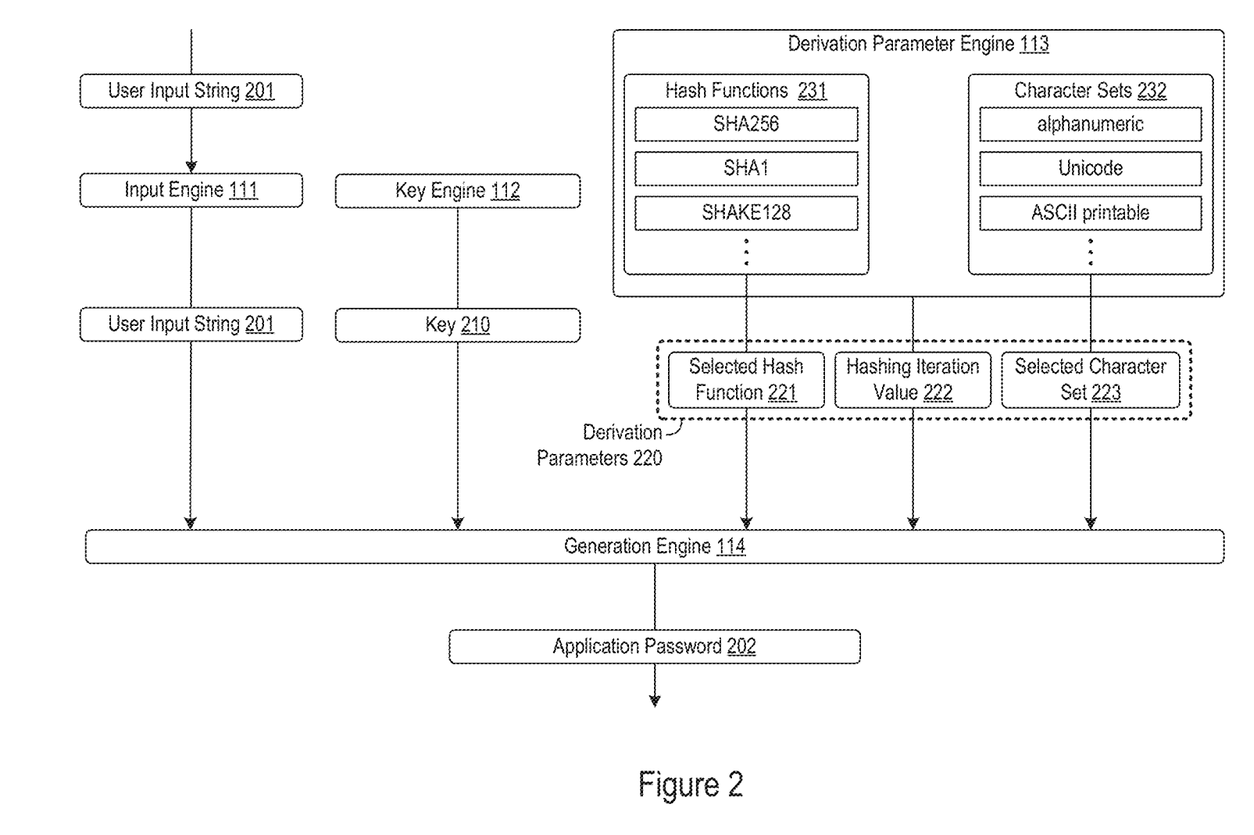
FIG. 2 shows an example of application password generation by a device through an input engine, key engine, derivation parameter engine, and generation engine.

FIG. 2 shows an example of password generation by the device 100 through the input engine 111, key engine 112, derivation parameter engine 113, and generation engine 114. In particular, the example shown in FIG. 2 may illustrate an initial password generation for a particular application, such as upon registering a user account for the particular application. The initial password generation may include receiving a user input string 201 and generating an application password 202 specific to a particular application from the user input string 201. Example features regarding re-generating the application password for subsequent accesses or logins to the particular application is described in greater detail below with reference to FIGS. 4 and 5.

Turning to the password generation example shown in FIG. 2, the input engine 111 may receive a user input string 201. The user input string 201 may include any string of characters or data provided by a user, such as a password or passphrase used by the user. The input engine 111 may receive the user input string 102 through a user interface of the device 100. For example, the input engine 111 may receive the user input string 201 through a keypad or keyboard, a voice interface and voice-to-text logic, or according to any other ways in which the device 100 receives data.

In some examples, the input engine 111 also obtains an indication of a particular application to generate an application password for. For instance, the input engine 111 may detect a particular web address in a web browser and correlate the particular web address to the particular application. As another example, the input engine 111 may obtain the indication of the particular application by determining the particular application as currently active for the device 100, such as by querying an activity manager or retrieving the application name for a currently active window in the device 100. The input engine 111 may pass the user input string 201, the indication of the particular application, or both, to the generation engine 114.

The key engine 112 may generate a key 210 for use in generating the application password 202. The key engine 112 may apply any random or pseudo-random key generation process to generate the key 210. In doing so, the key engine 112 may generate the key 210 to be a predetermined length, such as 128 bits or 256 bits as examples. The key length, random number generation algorithm, or any other parameter by which the key engine 112 generates the key 210 may be configurable. Upon generation, the key engine 112 may provide the key 210 to the generation engine 114 for use in generating the application password 202.

The derivation parameter engine 113 may specify one or more derivation parameters 220 for generating the application password. A derivation parameter 220 may refer to a configuration, constraint, or any other parameter used in generating the application password 202. Three examples of derivation parameters 220 are shown in FIG. 2 as a selected hash function 221, a hashing iteration value 222, and a selected character set 223, each of which is described in turn.

The derivation parameter engine 113 may select a hash function among a set of hash functions to use in generating the application password 202. The derivation parameter engine 113 may, for example, maintain a listing of multiple, different hash functions supported by the generation engine 114 for generating the application password. In the example shown in FIG. 2, the derivation parameter engine 113 includes a hash function listing shown as the set of hash functions 231, from which the derivation parameter engine 113 may determine the selected hash function 221. The set of hash functions 231 may include various hash function implementations, such as message digest algorithms (e.g., MD5), Secure Hash Algorithms (SHAs) such as SHA-0, SHA-1, SHA-2, SHA3, various cryptographic hash functions, and more. The set of hash functions 231 may be configurable, and the derivation parameter engine 113 may limit the set of hash functions 231 to include cryptographically secure algorithms, but not hash functions with known vulnerabilities. In FIG. 2 for example, the set of hash functions 231 includes the hash functions labeled as "SHA256", "SHA1", and "SHAKE128" as well as other hash functions from which the derivation parameter engine 113 may determine the selected hash function 221.

The derivation parameter engine 113 may determine the selected hash function 221 from among the set of set of hash functions 231 in various ways. In some examples, the derivation parameter engine 113 selects a particular hash function among the set of hash functions 231 through an indiscriminate selection process. The indiscriminate selection process performed by the derivation parameter engine 113 may refer to a process by which the derivation parameter engine 113 selects or determines a particular derivation parameter in an intentionally arbitrary manner. In that regard, the indiscriminate selection process may, for example, take the form of a random selection process, e.g., according to any number of random selection processes, techniques, or algorithms. In this example, the derivation parameter engine 113 may randomly select a hash function from the set of hash functions 231 to determine the selected hash function 221. As another example, the indiscriminate selection process may take the form of pseudo-random selection, such as pseudo-random numerical sampling or other cryptographically secure processes that mimic random number generation.

In other examples, the derivation parameter engine 113 may determine the selected hash function 221 according to a particular selection scheme. That is, the derivation parameter engine 113 may determine or specify a particular derivation parameter such as the selected hash function 221 through a specific selection mechanism (e.g., round-robin or weighted round-robin) or according to a predetermined or configurable ordering. The selection mechanism applied by the derivation parameter engine 113 to specify a particular derivation parameter may be configurable or set on a parameter-specific basis. In these ways and more, the derivation parameter engine 113 may determine a selected hash function 221 for use in generating the application password 202.

As another example of a derivation parameter 220, the derivation parameter engine 113 may set a hashing iteration value 222 for generating the application password 202. The hashing iteration value 222 may be a parameter applied to the selected hash function 221 in generating the application password 202, e.g., by specifying a number of times the selected hash function 221 is iterated to generate a hash value from which the application password 202 is obtained. The derivation parameter engine 113 may determine the hashing iteration value 222 through the indiscriminate selection process, e.g., by randomly determining the hashing iteration value 222. In some examples, the derivation parameter engine 113 generates the hashing iteration value 222 as a random number, thus increasing the entropy in generating the application password 202. The derivation parameter engine 113 may determine the hashing iteration value 222 with any number of determination criteria, such as within a particular numerical range (e.g., 500-1000), greater than a floor threshold (e.g., greater than 100), less than a ceiling threshold (e.g., less than 100,000), or according to any other combinations of determination criteria.

Continuing the discussion of derivation parameter examples, the derivation parameter engine 113 may select a character set to use in generating the application password 202. A character set may refer to an encoding scheme for representing characters. Thus, example character sets include the Unicode and American Standard Code for Information Interchange (ASCII) character sets. As described in greater detail below, the selected character set 223 determined by the derivation parameter engine 113 may be used to generate the application password 202 by mapping a hash value (or portions thereof) to character encoding values of the selected character set 223.

The derivation parameter engine 113 may select a particular character set to use for generating the application password 202 from among multiple character sets, e.g., from a listing of different character sets 232 supported by the generation engine 114. The character sets 232 may include any number of different character sets, such as character sets identified as "alphanumeric", "Unicode", and "ASCII printable" in FIG. 2. The generation engine 114 may support any number of character sets, allowing the derivation parameter engine 113 a range of characters set to (e.g., randomly) determine the selected character 223 from. To determine the selected character set 223, the derivation parameter engine 113 may apply an indiscriminate selection process. For example, the derivation parameter engine 113 may randomly select a character set from the listing of character sets 232 to obtain the selected character set 223.

In some examples, the derivation parameter engine 113 filters the listing of character sets 232 by excluding particular character sets from the selection process. The derivation parameter engine 113 may do so when the particular application for which the application password 202 is being generated includes a character constraint for the application password 202 (e.g., particular characters or character types that cannot be included in the application password 202). Accordingly, the derivation parameter engine 113 may filter, from the listing of character sets 232, a particular character set that includes a character (or multiple characters) prohibited for an application password 202 of the particular application. As one illustrative example, the particular application may reject passwords that include special characters such as slashes (e.g., "/" or "\" characters). In this example, the derivation parameter engine 113 may determine the selected character set 223 from among a filtered listing of the character sets 232 that do not include the slash characters (e.g., do not include a character encoding value for the prohibited characters).

As described above, the derivation parameter engine 113 may specify derivation parameters 220 for generating an application password 202 by determining a selected hash function 221, hashing iteration value 222, selected character set 223, or combinations thereof. While some examples of derivation parameters 220 have been described, the derivation parameter engine 113 may specify more, less, or other derivation parameters for generating the application password 202 as well. The derivation parameter engine 113 may specify different derivation parameters 220 for different applications. By doing so, the derivation parameter engine 113 may support generation of different application passwords 202 for different applications even when the same user input string 201 is provided.

The derivation parameter engine 113 may apply an indiscriminate selection process to determine the derivation parameters 220, e.g., through random selection. By randomizing the determination or selection of one or more derivation parameters 220, the derivation parameter engine 113 may increase the entropy in generating the application password 202. Doing so may increase the password strength and the difficulty in which an attacker can recover or crack the application password 202. Thus, the derivation parameter engine 113 may provide for increased password security in specifying the derivation parameters 220. Once determined, the derivation parameter engine 113 may pass the derivation parameters 220 to the generation engine 114.

The generation engine 114 may generate the application password 202 from the user input string 201, key 210, and derivation parameters 220. In particular, the generation engine 114 may apply the selected hash function 221 to the user input string 201 and the key 210 to obtain a hash value. For instance, the generation engine 114 may concatenate or otherwise combine the user input string 201 and key 210 to obtain a combined data string and apply the selected hash function 221 to the combined data string. In some examples, the generation engine 114 may mask a selected portion of the user input string 201, key 210, or both to control the length of the combined data string. Thus, the generation engine 114 may obtain a hash value from the user input string 201 and the key 210.

The generation engine 114 may generate the application password 202 for the particular application from the hash value. For example, the generation engine 114 may map a portion of the hash value to characters of the selected character set 223. In this example, the selected character set 223 may specify particular encoding values for various characters of the selected character set 223. To map the hash value, the generation engine 114 may identify a first portion of the hash value (e.g., the first 8 bits) as a character code and map the first portion as a particular character from the selected character set 223. The generation engine 114 may continue to map portions of the hash value as character encoding values of the selected character set 223 to obtain the application password 202.

The generation engine 114 may generate the application password 202 to be a particular character length. In that regard, the generation engine 114 may map the hash value (or portion thereof) to a number of characters of the character set equal to a password length value entered by a user or to meet a password length constraint for the particular application (e.g., to meet a minimum length requirement). Thus, the generation engine 114 may map a sufficient portion of the hash value to meet character length constraints for the application password 202

As another feature, the generation engine 114 may generate the application password 202 to meet password requirements of the particular application, including character-specific password constraints of the particular application. Character-specific password constraints may require that an application password 202 include specific character types within the application password 202, such as the required inclusion of a predetermined number of special characters, numerical characters, capital or lower-case letters, and the like. To meet the character-specific password constraints of the particular application, the generation engine 114 may examine a generated application password 202 to determine whether the character-specific password constraints are met. If not, the generation engine 114 may map a different portion of the hash value, e.g., by discarding the first "X" number of bits from the hash value (e.g., 2, 4, 11, 33 or any other configurable number). Then, the generation engine 114 may map the hash value with the discarded bits to character encoding values of the selected character set 223 to obtain another application password 202. The generation engine 114 may continue to do so until obtaining an application password 202 that meets the character-specific password constraints.

As another example after determining that the application password 202 does not meet a character-specific password constraint (or any other password requirement), the generation engine 114 may instruct the key engine 112 and derivation parameter engine 113 to provide a different key 210, different derivation parameters 220, or both. Then, the generation engine 114 may generate a different application password 202 from the different key 210, different derivation parameters 220, or both. The generation engine 114 may repeatedly generate application passwords with different keys 210 and/or different derivation parameters 220 until the generated application password 202 meets the character-specific password constraint or other password requirements.

As yet another example, the key engine 112 and the derivation parameter engine 113 may provide multiple keys 210 and multiple sets of derivation parameters 220 to the generation engine 114, through which the generation engine 114 may generate multiple, different application passwords 202 for the particular application. Then, the generation engine 114 may present the multiple, different application passwords through a user interface for user selection. Upon indication of a user selection for a particular application password of the multiple, different application passwords, the generation engine 114 may track the particular key 210 and particular derivation parameters 220 used to generate the particular application password and discard the unused application passwords and their associated keys 210 and derivation parameters 220. Thus, the generation engine 114 may generate the application password 202 for a particular application in any of the ways described above.

Figure 3:
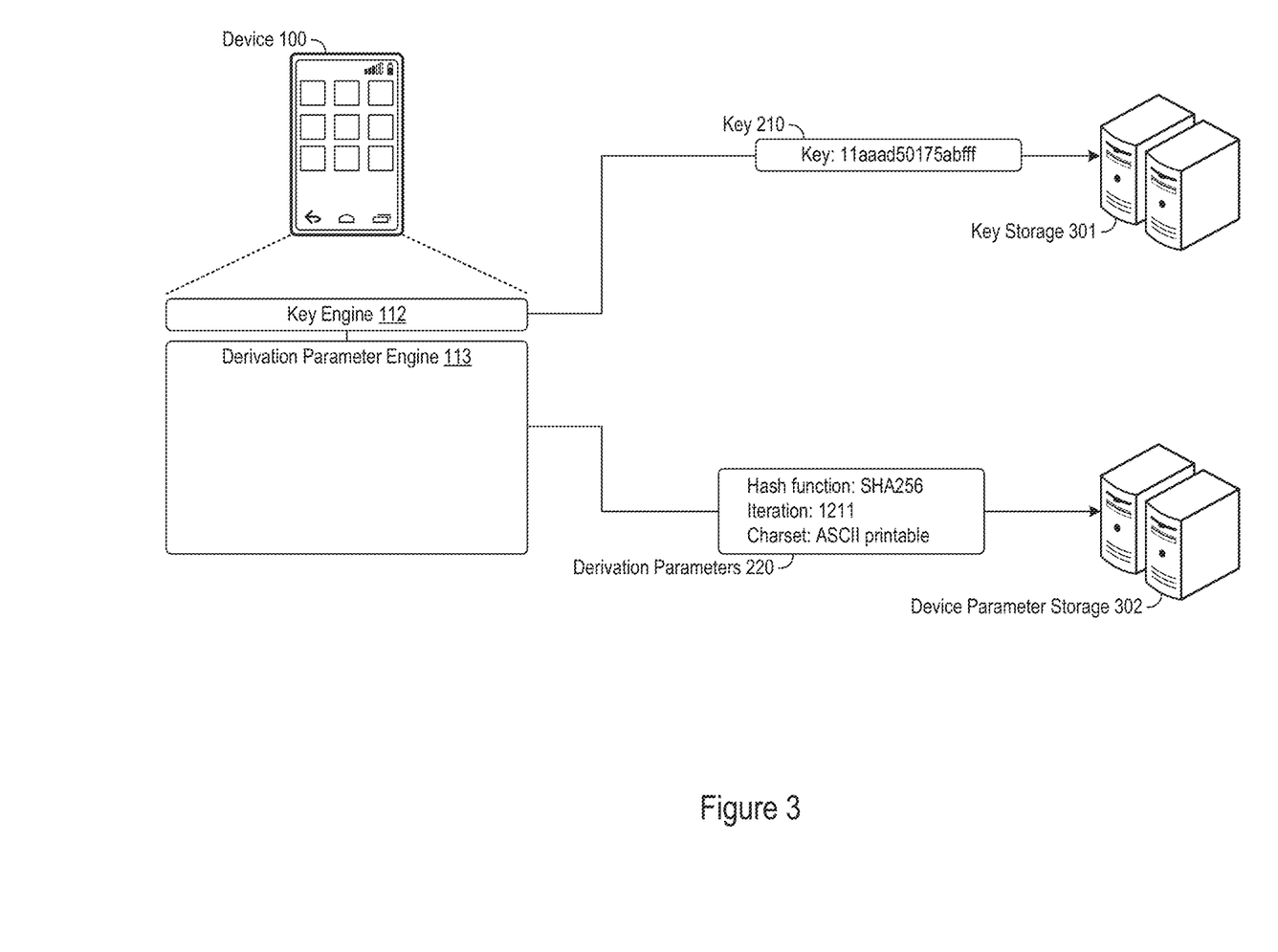
FIG. 3 shows an example of remote storage by the key engine and derivation parameter engine.

FIG. 3 shows an example of remote storage by the key engine 112 and derivation parameter engine 113. After generating the application password 202, a device 100 may store the key 210 and the derivation parameters 220 to support a subsequent generation (e.g., re-generation or retrieval) of the application password 202. In some examples, the device 100 transmits the key 210 and derivation parameters 220 for storage remote from the device 100. For example, the key engine 112 may send the key 210 used to generate the application password 202 to a key storage 301 and the derivation parameter engine 113 may send the derivation parameters 220 to a device parameter storage 302.

The key engine 112 may send the key 210 for remote storage by sending the value of the key 210 itself for remote storage. In the example shown in FIG. 3, the key engine 112 sends a key 210 with value "11aaad50175abfff" to the key storage 301. The derivation parameter engine 113 may send the derivation parameters 220 for remote storage by sending a value of a derivation parameter 220 or an indication of determined value of the derivation parameter 220. To illustrate through the example shown in FIG. 3, the derivation parameter engine 113 sends the derivation parameters 220 for remote storage by sending the "1211" value of the hashing iteration value 222 and indications of the selected hash function 221 and the selected character set 223 (through the indications "SHA256" and "ASCII printable" respectively).

The key storage 301 and device parameter storage 302 may be physically or logically separate from the device 100 and from one another. In that regard, remote storage of the key 210 and derivation parameters 210 at different storages may separate the storage of the elements used to generate the application password 202. Separate storage of the key 210 and the derivation parameters 220 may increase password security by requiring an attacker to breach multiple, different storage locations to access the elements used to generate the application password 202. Remote storage of the key 210 and derivation parameters 220 by the key engine 112 and derivation parameter engine 113 may also increase user flexibility by supporting retrieval and generation of the application password 202 from other devices besides the device 100, allowing for application logins or accesses from different devices while also providing increased password security.

Figure 4:
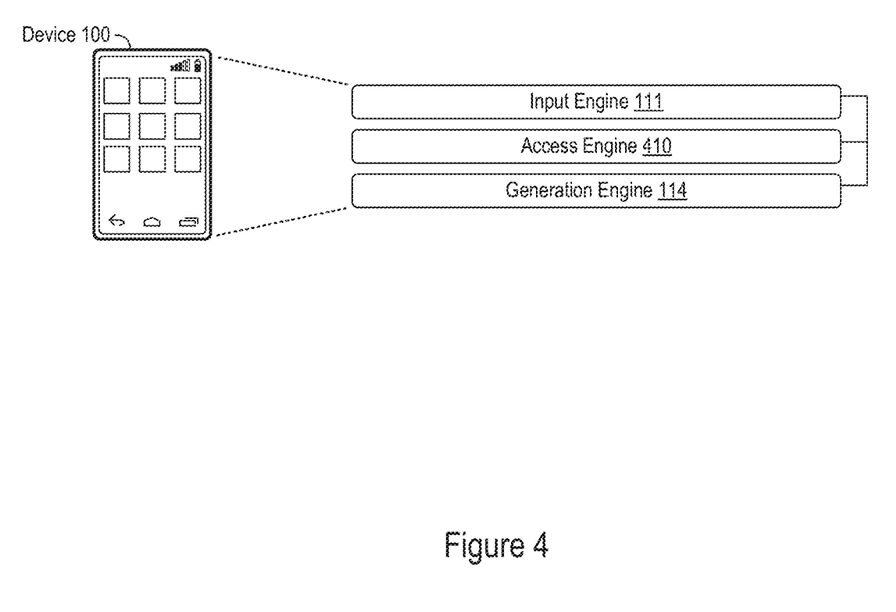
FIG. 4 shows an example of a device that supports application password generation with a key and derivation parameters.

FIG. 4 shows an example of a device 100 that supports application password generation with a key 210 and derivation parameters 220. The device 100 may generate an application password for accessing a particular application. In particular, the device 100 may re-generate or retrieve a previously generated application password. The device 100 shown in FIG. 4 includes an input engine 111, access engine 410, and generation engine 114. As with the engines 111-114, the device 100 may implement the access engine 410 as any combination of digital logic, hardware, electronic circuitry, and executable instructions stored on a machine-readable medium.

In operation, the input engine 111 may receive a user input string 201 in as described above. The input engine 111 may also receive (e.g., obtain) an indication of a particular application to re-generate the application password 202 for. The access engine 410 may access, from a first storage remote to the device 100, a key 210 generated for the particular application. The access engine 410 may also access, from a second remote storage, derivation parameters 220 of the application password 202 for the particular application, the derivation parameters 220 including an indication of a hash function that was selected for generation of the application password 202 through an indiscriminate selection process. The generation engine 114 may apply the hash function to the user input string 201 and the key 210 to obtain a hash value and generate the application password 202 for the particular application from the hash value.

Figure 5:
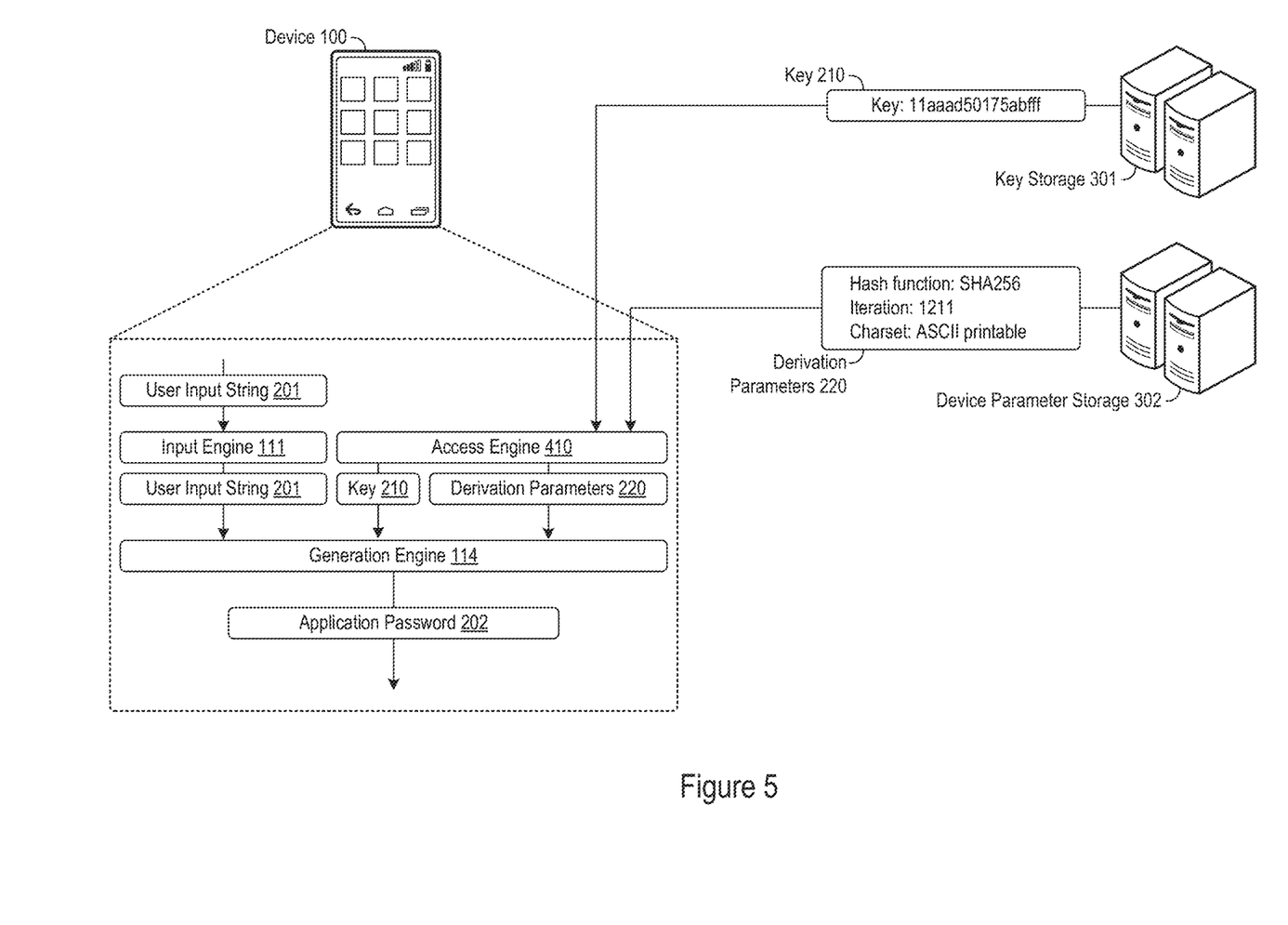
FIG. 5 shows an example of application password generation by a device through an input engine, access engine, and generation engine.

FIG. 5 shows an example of application password generation by the device 100 through the input engine 111, access engine 410, and generation engine 114. In particular, the device 100 may re-generate a previously generated application password 202 for a particular application. The device 100 may do so because the device 100 may determine not to store the application password 202 itself after generation, either locally or remotely. By doing so, the device 100 may increase the difficulty of password breach as the actual application password 202 is not stored in any particular location, and instead generated on-demand for accesses to the particular application.

In the example shown in FIG. 5, the input engine 111 receives a user input string 201 for generating the application password 202. The access engine 410 retrieves other elements used to generate the application password 202, including the key 210 and derivation parameters 220. The access engine 410 may retrieve the key 210 from the key storage 301 and the derivation parameters 220 from the device parameter storage 302. In doing so, the access engine 410 may provide an indication of the particular application, a user identification, or both, as indices into the storages to retrieve the appropriate key 210 and derivation parameters 220. FIG. 5 includes the example key and derivation parameter values used in FIG. 3, and the access engine 410 retrieves the key with value "11aaad50175abfff" and derivation parameters 220 including a "1211" value for the hashing iteration value 222 and indications "SHA256" and "ASCII printable" for the selected hash function 221 and the selected character set 223 respectively. The generation engine 114 receives the user input string 201, key 210, and derivation parameters 220 and generates the application password 202. Thus, the device 100 may support re-generation of a previously generated application password 202.

Although shown in separate figures above, a device 100 may support both the generation of an application password for an initial access (or account registration) for a particular application as well as for subsequent access to the particular application. Put another way, the device 100 may support an initial generation of the application password by generating the key 210 and specifying the derivation parameters 220 as well as subsequent re-generation of the application password by accessing the key 210 and derivation parameters 220 from remote storage. Accordingly, the device 100 may include the input engine 111, key engine 112, derivation parameter engine 113, access engine 410, and generation engine 114 to support these features.

Figure 6:
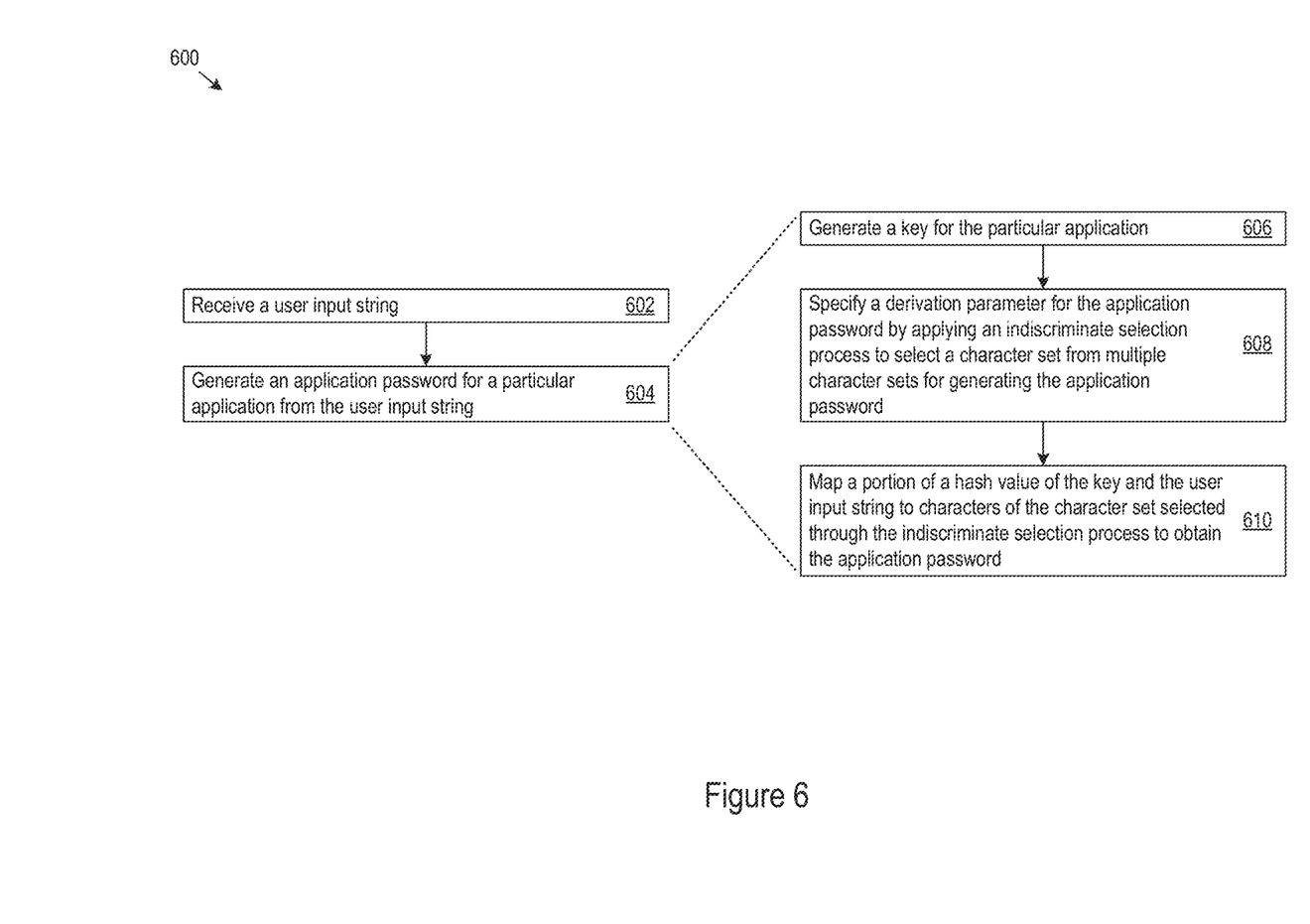
FIG. 6 shows an example of logic that a device may implement to generate an application password.

FIG. 6 shows an example of logic 600 that a device 100 may implement. The device 100 may implement the logic 600 to generate an application password for a particular application, and as hardware, executable instructions stored on a machine-readable medium, or as combinations thereof. As one example, the device 100 may implement the logic 600 through an input engine 111, key engine 112, derivation parameter engine 113, and generation engine 114. The device 100 may perform or execute the logic 600 as a method or process to generate an application password through a random key and derivation parameters remotely stored.

The device 100 may receive a user input string through the input engine 111 (602) and generate an application password for a particular application from the user input string (604). To generate the application password 202, the key engine 112 may generate a key 210 for the particular application (606). The derivation parameter engine 113 may specify a derivation parameter 220 of the application password 202 by applying an indiscriminate selection process to select a character set from multiple character sets for generating the application password 202 (608). Applying the indiscriminate selection process may include the derivation parameter engine 113 randomly selecting the character set from the multiple character sets. The derivation parameter engine 113 may specify other derivation parameters 220 as well, such as a selected hash function 221 and hashing iteration value 222 determined through the indiscriminate selection process. The generation engine 114 may map a portion of a hash value of the key 210 and the user input string 201 to characters of the character set selected through the indiscriminate selection process to obtain the application password 202 (610).

In some examples, the logic 600 may further include sending the derivation parameter to a first remote storage device. The derivation parameter engine 113 may do so by sending an indication of the character set selected through the indiscriminate selection process to the first remote device. The logic 600 may also include sending the key 210 for the particular application to a second remote device for storage, for example by the key engine 112. The second remote device may be different from the first remote device. In some examples, the logic 600 may further include obtaining a password length value by the input engine 111, and the generation engine 114 may map the portion of the hash value to a number of characters of the character set equal to the password length value.

Figure 7:
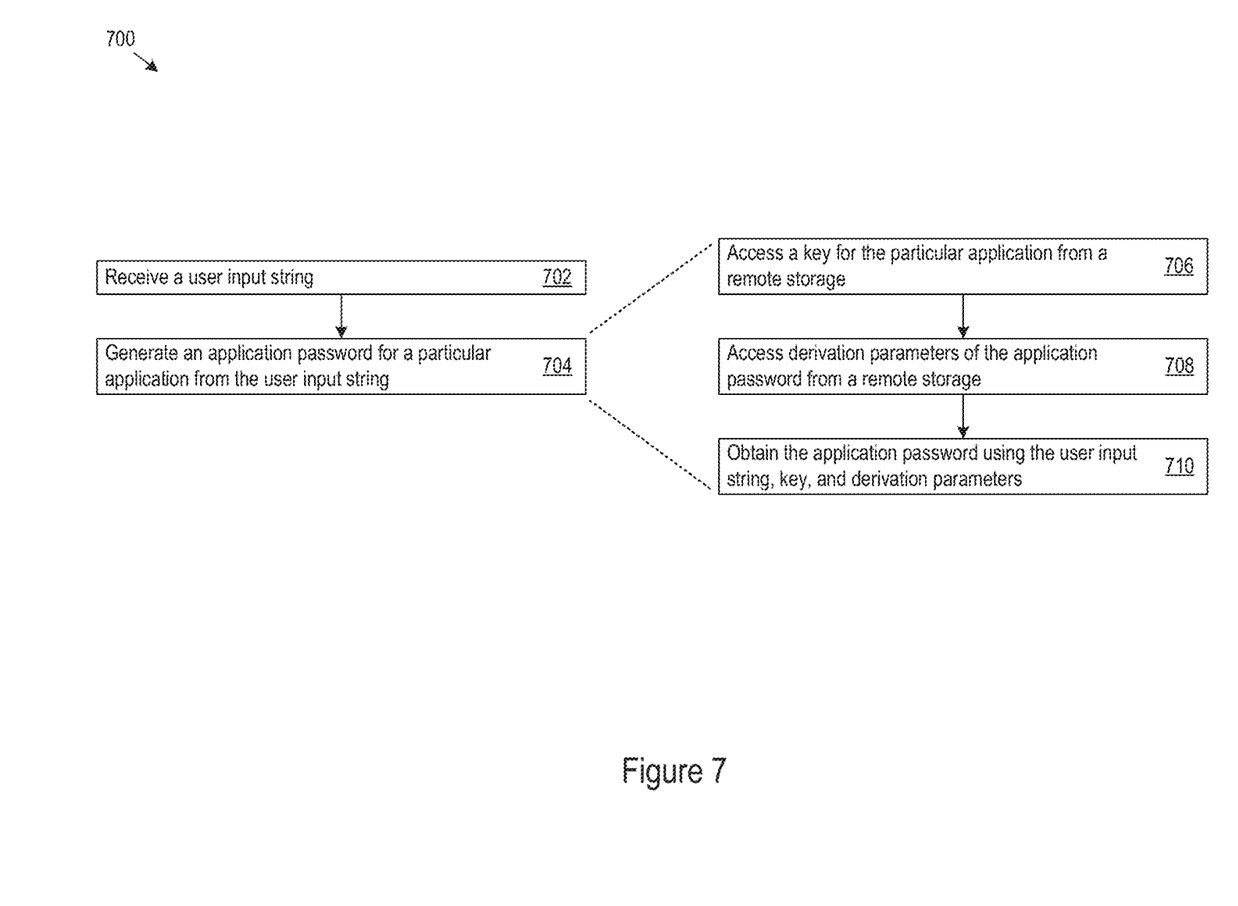
FIG. 7 shows another example of logic that a device may implement to generate an application password.

FIG. 7 shows another example of logic 700 that a device 100 may implement to generate an application password. The device 100 may implement the logic 700 to re-generate an application password for a particular application, and in the form of hardware, executable instructions stored on a machine-readable medium, or as combinations thereof. As one example, the device 100 may implement the logic 700 through an input engine 111, access engine 410, and generation engine 114. The device 100 may perform or execute the logic 700 as a method or process to generate an application password through a random key and derivation parameters remotely stored.

The device 100 may receive a user input string through the input engine 111 (702) and generate an application password 202 for a particular application from the user input string (704). In doing so, the access engine 410 may access a key 210 for the particular application from a remote storage (706) and access derivation parameters 220 of the application password 202 from a remote storage (708). Then, the generation engine 114 may obtain the application password 202 using the user input string 201, key 210, and derivation parameters 220 in any of the ways described above.

Figure 8:
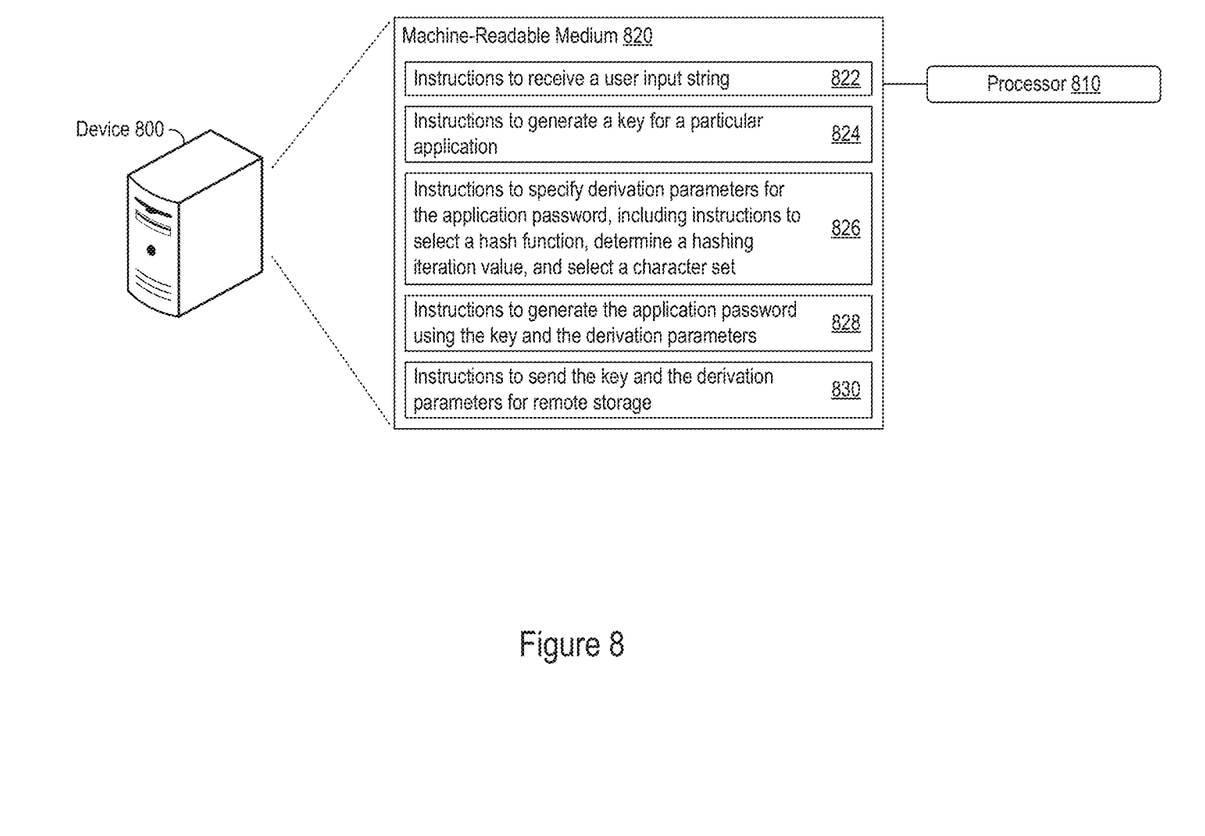
FIG. 8 shows an example of a device that supports application password generation with a key and derivation parameters.

FIG. 8 shows an example of a device 800 that supports password generation with a key and derivation parameters. The device 800 may include a one or more processors 810, and the processor(s) 810 may include a central processing unit (CPU), microprocessor, or any hardware device suitable for executing instructions stored on a machine-readable medium. The device 800 may include a machine-readable medium 820. The machine-readable medium 820 may be any non-transitory electronic, magnetic, optical, or other physical storage device that stores executable instructions, such as the instructions 822, 824, 826, 828, and 830 shown in FIG. 8. As such, the machine-readable medium 820 may be, for example, Random Access Memory (RAM), an Electrically-Erasable Programmable Read-Only Memory (EEPROM), a storage drive, an optical disk, and the like.

The device 800 may execute instructions stored on the machine-readable medium 820 through the processor(s) 810. Executing the instructions may cause the device 800 to perform any combination of the password generation features described herein, including according to any of the password generation features described above. For example, executing the instructions 822 and 824 may cause the processor(s) 810 to receive a user input string 201 for generating an application password 202 for a particular application and generate a key 210 for the particular application. Executing the instructions 826 may cause the processor(s) 810 to specify derivation parameters 220 for the application password 202, and may include instructions to select a hash function from a set of hash functions through an indiscriminate selection process, determine a hashing iteration value through the indiscriminate selection process, and select a character set through the indiscriminate selection process. Executing the instructions 828 may cause the processor(s) 810 to generate the application password 202 using the key 210 and the derivation parameters 220 and executing the instructions 830 may cause the processor(s) 810 to send the key 210 and the derivation parameters 220 for remote storage.

In some examples, executing the instructions 828 may cause the processor(s) 810 to generate the application password 202 are to generate the application password 202 using the key 210 and the derivation parameters 220 by applying the hash function to the key 210 and the user input string 201 to obtain a hash value according to the hashing iteration value and mapping a portion of the hash value as character codes of the character set selected through the indiscriminate selection process to obtain the application password 202. In some examples, the machine-readable medium 820 may further include instructions to determine that the application password 202 does not satisfy a password requirement of the particular application, and in response, generate a different key, different derivation parameters, or both; and generate another application password using the different key, the different derivation parameters, or both. As yet another example, executing the instructions 830 may cause the processor(s) 810 to send the key 210 and the derivation parameters 220 for remote storage by sending the key 210 to a first remote device and sending the derivation parameters 220 to a second remote device different from the first remote device.

The systems, methods, devices, circuitry, and logic described above, including the input engine 111, key engine 112, derivation parameter engine 113, generation engine 114, and access engine 410, may be implemented in many different ways in many different combinations of hardware, logic, circuitry, and executable instructions stored on a machine-readable medium. For example, any combination of the input engine 111, key engine 112, derivation parameter engine 113, generation engine 114, and access engine 410 may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including any features of the input engine 111, key engine 112, derivation parameter engine 113, generation engine 114, and access engine 410.

The processing capability of the systems, devices, and circuitry described herein, including the input engine 111, key engine 112, derivation parameter engine 113, generation engine 114, and access engine 410, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library.

While various examples have been described above, many more implementations are possible.

The invention claimed is:

1. A non-transitory machine-readable medium comprising executable instructions to:
   receive a user input string for generating an application password for a particular application;
   generate a key for the particular application;
   specify derivation parameters for the application password, including instructions to:
      select a hash function from a set of hash functions through an indiscriminate selection process;
      determine a hashing iteration value through the indiscriminate selection process; and
      select a character set through the indiscriminate selection process;
   generate the application password using the key and the derivation parameters; and
   send the key and the derivation parameters for remote storage by:
   sending the key to a first remote device; and
   sending the derivation parameters to a second remote device different from the first remote device.

2. The non-transitory machine-readable medium of claim 1, wherein the executable instructions are to generate the application password using the key and the derivation parameters by:
   applying the hash function to the key and user input string to obtain a hash value according to the hashing iteration value; and
   mapping a portion of the hash value as character codes of the character set selected through the indiscriminate selection process to obtain the application password.

3. The non-transitory machine-readable medium of claim 2, wherein the executable instructions are further to determine that the application password does not satisfy a password requirement of the particular application, and in response:
   generate a different key, different derivation parameters, or both; and
   generate another application password using the different key, the different derivation parameters, or both.

4. A method comprising:
   receiving a user input string; and
   generating an application password for a particular application from the user input string by:
      generating a key for the particular application;
      specifying a derivation parameter of the application password by applying an indiscriminate selection process to select a character set from multiple character sets for generating the application password; and
      mapping a portion of a hash value of the key and the user input string to characters of the character set selected through the indiscriminate selection process to obtain the application password;
      obtaining a password length value; and
      wherein mapping the portion of the hash value comprises mapping a number of characters of the character set equal to the password length value.

5. The method of claim 4, further comprising sending the derivation parameter to a first remote device for storage.

6. The method of claim 5, wherein sending the derivation parameter comprises sending an indication of the character set selected through the indiscriminate selection process to the first remote device.

7. The method of claim 5, further comprising sending the key for the particular application to a second remote device for storage, the second remote device different from the first remote device.

8. The method of claim 4, wherein applying the indiscriminate selection process comprises randomly selecting the character set from the multiple character sets.

9. The method of claim 4, further comprising:
   specifying another derivation parameter by applying the indiscriminate selection process to select a hash function from a set of hash functions; and applying the hash function to the user input string and the key to obtain the hash value.

10. The method of claim 4, further comprising:
specifying another derivation parameter by applying the indiscriminate selection process to determine a hashing iteration value; and
determining the hash value according to the hashing iteration value determined through the indiscriminate selection process.

11. A non-transitory machine-readable medium comprising executable instructions to:
receive a user input string for generating an application password for a particular application;
generate a key for the particular application;
specify derivation parameters for the application password, including instructions to:
select a hash function from a set of hash functions through an indiscriminate selection process;
determine a hashing iteration value through the indiscriminate selection process; and
select a character set through the indiscriminate selection process;
generate the application password using the key and the derivation parameters by applying the hash function to the key and user input string to obtain a hash value according to the hashing iteration value and mapping a portion of the hash value as character codes of the character set selected through the indiscriminate selection process to obtain the application password;
send the key and the derivation parameters for remote storage;
generate the application password using the key and the derivation parameters by:
determine that the application password does not satisfy a password requirement of the particular application, and in response:
generate a different key, different derivation parameters, or both; and
generate another application password using the different key, the different derivation parameters, or both.

* * * * *